(12) United States Patent
Wattiau et al.

(10) Patent No.: US 11,426,676 B2
(45) Date of Patent: Aug. 30, 2022

(54) GAS/LIQUID SEPARATION COLUMN CONTAINING A DISPENSING DEVICE

(71) Applicant: L'Air Liquide, Societe Anonyme pour l'Etude et l'Exploitation des Procedes Georges Claude, Paris (FR)

(72) Inventors: Mikael Wattiau, Les Loges en Josas (FR); Benoit Davidian, Champigny sur Marne (FR)

(73) Assignee: L'Air Liquide, Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 17/009,592

(22) Filed: Sep. 1, 2020

(65) Prior Publication Data

US 2021/0060453 A1 Mar. 4, 2021

(30) Foreign Application Priority Data

Sep. 2, 2019 (FR) ...................................... 1909613

(51) Int. Cl.
*B01D 3/00* (2006.01)
*B01D 53/18* (2006.01)
*B01J 4/00* (2006.01)

(52) U.S. Cl.
CPC ........... *B01D 3/008* (2013.01); *B01D 53/185* (2013.01); *B01J 4/004* (2013.01); *B01J 2204/002* (2013.01)

(58) Field of Classification Search
CPC ........ B01D 3/008; B01D 53/185; B01D 3/20; B01D 3/324; B01D 19/0005; B01D 3/00; B01J 4/004; B01J 2204/002
See application file for complete search history.

(56) References Cited

U.S. PATENT DOCUMENTS

| | | | | | |
|---|---|---|---|---|---|
| 3,158,171 | A | * | 11/1964 | Eckert | B01D 3/008 261/95 |
| 3,431,084 | A | * | 3/1969 | Forbes | C10G 49/002 422/220 |

(Continued)

FOREIGN PATENT DOCUMENTS

| | | |
|---|---|---|
| EP | 0 879 626 | 11/1998 |
| EP | 2 653 203 | 10/2013 |
| EP | 3 034 142 | 6/2016 |

OTHER PUBLICATIONS

French Search Report for FR 1 909 613, dated May 4, 2020.

*Primary Examiner* — Stephen Hobson
(74) *Attorney, Agent, or Firm* — Justin K. Murray

(57) ABSTRACT

Gas/liquid separation column, containing a device for dispensing a liquid, intended for a gas/liquid separation column, comprising: a plate, in which several orifices are arranged, through which the liquid is able to leave the dispensing device; a plurality of stacks extending from the plate, each stack being configured to be followed by the gas; a plurality of plugging means respectively arranged at one end of one of the stacks, each plugging means having a gutter shape allowing a first portion of the liquid to be collected; a plurality of troughs for directly collecting a second portion of the liquid, at least one part of the orifices being distributed in the base of said troughs, each plugging means comprising a first open longitudinal end and a second closed longitudinal end.

9 Claims, 5 Drawing Sheets

(56) References Cited

U.S. PATENT DOCUMENTS

| | | | | |
|---|---|---|---|---|
| 3,501,400 A * | 3/1970 | Brody | B01D 3/18 | 203/40 |
| 4,126,539 A * | 11/1978 | Derr, Jr. | B01J 8/0492 | 208/143 |
| 4,330,505 A * | 5/1982 | Gupta | B01J 8/0492 | 422/115 |
| 4,432,913 A * | 2/1984 | Harper | B01D 3/008 | 261/97 |
| 4,744,929 A * | 5/1988 | Robinson | B01D 3/20 | 261/114.1 |
| 5,145,612 A * | 9/1992 | Reay | B01D 3/20 | 261/96 |
| 5,192,465 A * | 3/1993 | Petrich | B01D 3/008 | 261/97 |
| 5,240,652 A * | 8/1993 | Taylor | B01D 3/20 | 261/97 |
| 5,645,770 A * | 7/1997 | McNulty | B01D 3/008 | 261/97 |
| 5,752,538 A * | 5/1998 | Billingham | B01D 3/20 | 137/561 A |
| 5,935,389 A * | 8/1999 | Hine | B01D 3/20 | 261/96 |
| 6,536,233 B2 * | 3/2003 | Darredeau | F25J 3/04927 | 62/643 |
| 6,695,008 B2 * | 2/2004 | Fehr | B01D 3/008 | 137/561 A |
| 7,114,709 B2 * | 10/2006 | Ender | B01D 3/008 | 261/DIG. 85 |
| 9,120,064 B2 | 9/2015 | Horoun et al. | | |
| 9,387,414 B2 * | 7/2016 | Jansen | B01D 3/205 | |
| 10,201,766 B2 | 2/2019 | Haroun et al. | | |
| 10,569,190 B2 * | 2/2020 | Ito | F25J 3/04284 | |
| 10,722,851 B2 * | 7/2020 | Roesler | F25J 3/04927 | |
| 10,982,905 B2 * | 4/2021 | Steinbauer | F28D 7/024 | |
| 11,007,453 B2 * | 5/2021 | Haroun | B01D 3/24 | |
| 11,040,293 B2 * | 6/2021 | Kanzler | B01D 3/20 | |
| 2002/0050657 A1 * | 5/2002 | Werlen | F25J 3/04412 | 261/112.2 |
| 2004/0099969 A1 * | 5/2004 | Larson | F25J 3/04927 | 261/114.5 |
| 2008/0202914 A1 * | 8/2008 | Sharma | B01D 1/305 | 261/109 |
| 2012/0111762 A1 * | 5/2012 | Patel | F28F 25/02 | 206/557 |
| 2012/0160453 A1 * | 6/2012 | Alzner | F25J 3/0295 | 165/104.13 |
| 2012/0175792 A1 * | 7/2012 | Nieuwoudt | B01D 3/205 | 261/114.5 |
| 2013/0277869 A1 * | 10/2013 | Haroun | B01F 23/2321 | 261/114.5 |
| 2014/0166110 A1 * | 6/2014 | Nieuwoudt | F28F 25/04 | 261/23.1 |
| 2014/0374927 A1 * | 12/2014 | Brown | B01D 3/008 | 261/110 |
| 2015/0143845 A1 * | 5/2015 | Wakabayashi | B01D 3/007 | 62/630 |
| 2016/0061541 A1 * | 3/2016 | Chen | B01D 3/008 | 261/97 |
| 2016/0107099 A1 * | 4/2016 | Haroun | B01D 53/185 | 261/114.5 |
| 2016/0151722 A1 * | 6/2016 | Wehrli | B01F 23/214 | 261/114.5 |
| 2016/0175733 A1 * | 6/2016 | Haroun | B01D 53/185 | 261/113 |
| 2016/0175734 A1 * | 6/2016 | Haroun | B01D 3/20 | 261/114.5 |
| 2017/0173492 A1 * | 6/2017 | Hammon | B01D 3/26 | |
| 2017/0312650 A1 * | 11/2017 | Augier | B01D 3/009 | |
| 2018/0140966 A1 * | 5/2018 | Brahem | B01D 3/324 | |
| 2018/0304192 A1 * | 10/2018 | Perdu | B01D 3/26 | |
| 2019/0107021 A1 * | 4/2019 | Bahadur Thapa | B01D 53/1481 | |
| 2019/0184331 A1 * | 6/2019 | Haroun | B01J 19/32 | |
| 2019/0321745 A1 * | 10/2019 | Perdu | B01D 53/1406 | |
| 2020/0306720 A1 * | 10/2020 | Sandford | F28C 3/08 | |

* cited by examiner

GAS/LIQUID SEPARATION COLUMN CONTAINING A DISPENSING DEVICE

CROSS REFERENCE TO RELATED APPLICATIONS

This application claims the benefit of priority under 35 U.S.C. § 119 (a) and (h) to French patent application No. FR1909613, filed Sep. 2, 2019, the entire contents of which are incorporated herein by reference.

FIELD OF THE INVENTION

The field of the present invention relates to gas/liquid separation columns, and more particularly to the dispensing devices intended to equip such columns.

BACKGROUND OF THE INVENTION

Gas/liquid separation columns have been known for many years and allow, for example, the various chemical elements incorporated in the composition of a homogeneous fluid to be separated, for example, by distillation or by absorption.

These columns conventionally comprise a plurality of contact components, which allow contact to be made between a liquid phase and a gaseous phase of the fluid containing the elements to be separated. Between two successive contact components, these columns can comprise a collector, which collects the liquid originating from a first contact component in order to direct it towards a dispensing device, which for its part is configured to guide the liquid towards a second contact component and homogeneously distribute it over this second contact component. At the same time, this collector and this dispensing device are able to let the gas that leaves the second contact component pass through towards the first contact component.

However, the liquid that leaves the first contact component can have slightly different compositions, more specifically in terms of the proportion of the elements forming this liquid, depending on the site where the liquid exits from the first contact component to the next. Therefore, this liquid may need to be remixed so that its composition is completely homogeneous and so that, subsequently, the distribution on the second contact component is also homogeneous. The dispensing devices thus increasingly integrate systems for collecting the liquid and for mixing the liquid thus collected. Economic constraints nevertheless impose limits on the dimensions of these columns.

Furthermore, the mixing of the liquid exiting the contact component generally remains one-way, and therefore is incomplete.

SUMMARY OF THE INVENTION

The aim of certain embodiments of the present invention is to overcome this disadvantage by proposing a liquid dispensing device able to collect the liquid and to allow this liquid to be mixed in at least two separate directions.

One embodiment of the present invention thus relates to a gas/liquid separation column, comprising a liquid dispensing device and a gas/liquid contact component, adapted so that a fluid flows in a first liquid circulation direction through the device upstream of the gas/liquid contact component, the dispensing device comprising:

a plurality of stacks extending from a lower plate along a vertical axis perpendicular to a first plane, each stack being configured to be followed by the gas in a second circulation direction opposite the first direction, the stacks being disposed above cutouts in the lower plate, at least one opening being provided laterally in a wall demarcating the stack in the vicinity of a vertical end of the stack and of the plugging means that plug this vertical end;

a plurality of plugging means, respectively arranged at an upper vertical end of one of the stacks and over the entire longitudinal dimension of said stack, each plugging means having a gutter shape allowing direct collection of a first portion of the liquid that is conveyed through the dispensing device, the plugging means each having a first open longitudinal end and a second closed longitudinal end, so as to force the liquid to exit the gutter through the first open longitudinal end;

the lower plate mainly falling within the first plane and in which several orifices are arranged, through which the liquid is able to leave the dispensing device;

a plurality of troughs configured to directly collect a second portion of the liquid conveyed through the dispensing device, each trough mainly extending along a longitudinal axis perpendicular to the vertical axis and parallel to the first plane and being transversely demarcated by two stacks, at least one part of the orifices being distributed in the base of said troughs, each trough having the lower plate for the base, each trough comprising a first open longitudinal end (236) and a second closed longitudinal end (336), the first open longitudinal end of each trough comprising a wall (436), in which a groove (536) is provided, through which the liquid is able to join the relevant trough (136);

the dispensing device being configured so that the first portion of the liquid leaving the troughs formed by the plugging means pours into the troughs;

at least one upper peripheral channel provided between the longitudinal ends of each plugging means and a peripheral edge of the dispensing device, said at least one upper peripheral channel forming an upper plate of substantially annular shape and being configured in order to, on the one hand, directly collect a third portion of the liquid conveyed through the dispensing device and, on the other hand, allow the circulation of the first portion of liquid exiting the plugging means towards the troughs, the upper peripheral channel being located above the lower plate at an intermediate level of the height of the stacks.

The dispensing device is configured so that the liquid leaving the troughs formed by the plugging means pours into the troughs. According to the invention, at least one plugging means comprises a first open longitudinal end and a second closed longitudinal end, so as to force the liquid to exit the trough through the first open longitudinal end.

"Transversely demarcated" is understood to mean the fact that each trough is "demarcated along a transverse axis", i.e. an axis perpendicular to the longitudinal axis and to the vertical axis. In other words, the stacks are stacked one after the other along this transverse axis, with a trough being inserted between two successive stacks.

It is understood that the liquid can only leave the dispensing device through the orifices provided in the lower plate of this dispensing device. With these orifices being provided at least partly in the base of the troughs, it is understood that the liquid received in the gutters formed by the plugging means must be directed towards these troughs in order to be able to leave the dispensing device through the orifices. In any case, the liquid must be directed towards the troughs in order to join the lower plate in which all the orifices are provided.

Advantageously, the present invention allows, by a simple and inexpensive means, this liquid to be mixed as it is routed towards these troughs. Indeed, it is understood that by modulating which ends of the plugging means are open or closed, it allows transverse mixing of the liquid by allowing the liquid to leave the gutters on either side of the dispensing device. Advantageously, the plugging means, which are arranged to prevent the liquid from entering the stacks through which the gas rises, therefore allow the liquid to be collected, to be guided towards a particular zone of the upper plate, then towards the lower plate, via the suitable troughs.

It is to be noted that all the liquid passes through the troughs in order to join the lower plate, but only one portion of this liquid, in this case the second portion, is directly collected by these troughs, i.e. without passing through the plugging means arranged on the stacks.

The base of each trough is the lower plate.

The distributor allows the liquid directly collected by the troughs to be poured into the column by passing through the upper peripheral channel.

As previously stated, these stacks are also configured to allow the gas to pass through the dispensing device. In other words, this means that the lower plate of the dispensing device has cutouts provided facing these stacks. Similarly, in order for the gas to be able to leave these stacks, at least one opening is laterally provided in a wall demarcating the stack, in the vicinity of the vertical end of the relevant stack and of the plugging means, which plugs this vertical end. For example, these openings can be produced by oblong shaped holes perforated in the wall of each stack.

According to one feature of the invention, the dispensing device comprises at least one upper peripheral channel provided between the longitudinal ends of each plugging means and a peripheral edge of the dispensing device, said at least one upper peripheral channel being configured to, on the one hand, directly collect a third portion of the liquid conveyed through the dispensing device and, on the other hand, to allow the first portion of liquid exiting the plugging means to circulate towards the troughs.

According to one feature of the invention, the amount of the first portion of the liquid collected by the plugging means arranged on the stacks cumulated with the third portion of the liquid collected by the at least one upper peripheral channel is greater than that of the second portion of this liquid directly collected by the troughs.

In other words, the plugging means and the at least one upper peripheral channel extend so that, on the upper plate, the overall extension surface of the plugging means cumulated with the overall extension surface of the at least one upper peripheral channel is greater than the overall extension surface of the troughs.

In particular, it can be stipulated that the overall extension surface of the plugging means on the upper plate cumulated with the overall extension surface of the at least one upper peripheral channel corresponds to at least 40% of the overall surface of this upper plate. In other words, in this case, approximately 40% of the descending liquid conveyed through the dispensing device is directly collected on the lower plate, in the base of the troughs. This thus ensures that a substantial part of the liquid is remixed, so that the liquid that leaves the dispensing device has a homogeneous composition.

According to a first embodiment of the present invention, each upper plate comprises two upper plate portions arranged on either side of a transverse axis in the first plane, each upper plate portion comprises a first transverse part and a second transverse part, the first transverse part of the first upper plate portion being arranged in the extension of the first transverse part of the second upper plate portion. According to this first embodiment, a first set of open longitudinal ends of the plugging means is arranged in the first transverse part of one of the upper plate portions and a second set of these open longitudinal ends of the plugging means is arranged in the second transverse part of the other upper plate portion. Advantageously, the first set and the second set of the open longitudinal ends of the plugging means can respectively correspond to half of these open longitudinal ends. Therefore, it is understood that the liquid leaving the stacks at the first transverse part of one of the upper plate portions joins the lower plate through a trough provided in the second transverse part of this upper plate portion.

Advantageously, this allows sufficient and homogeneous horizontal mixing, i.e. along the transverse axis, of the liquid that passes through the dispensing device.

According to a second embodiment of the present invention, each upper plate comprises two upper plate portions arranged on either side of a transverse axis in the first plane, each upper plate portion comprises a first transverse end part, a central part and a second transverse end part, the central part of each upper plate portion being arranged between the two transverse end parts of the relevant upper plate portion, the first transverse end part, the central part and the second transverse end part of the first upper plate portion being arranged in the extension, respectively, of the first transverse end part, of the central part and of the second transverse end part of the second upper plate portion.

According to this second embodiment, the set of open longitudinal ends of the plugging means emerging in the same upper plate portion is distributed in either one of the transverse end parts of said upper plate portion and the set of open longitudinal ends of the plugging means emerging in the other upper plate portion is arranged in the central part of this other upper plate portion. In other words, the liquid leaving the stacks emerging in the transverse end parts of one of the upper plate portions joins the lower plate through a trough provided in the central part of this upper plate portion. Similarly, the liquid leaving the stacks emerging in the central part of one of the upper plate portions joins the lower plate through a trough provided in one of the transverse end parts of this upper plate portion.

As previously stated, only one portion of the liquid passes through the stacks. Therefore, it is understood that, irrespective of the selected embodiment, the present invention advantageously allows this first portion of the liquid and the third portion of the liquid directly collected by the at least one upper peripheral channel to be mixed with the second portion of the liquid directly collected by the troughs, thus ensuring complete and homogeneous transverse mixing of the liquid before it leaves the dispensing device.

According to one feature of the present invention, each trough, transversely demarcated by at least one stack, comprises a first open longitudinal end and a second closed longitudinal end. According to this feature, it is understood that it is then possible to more precisely direct the liquid collected by the plugging means towards zones of the lower plate, and therefore further improve the transverse remixing of this liquid. Indeed, the liquid that leaves one of these plugging means should circulate at least until it encounters an open longitudinal end of one of the troughs, in order to join the lower plate and be able to leave the dispensing device.

For example, the first open longitudinal end of each trough comprises a wall, in which a groove is provided, through which the liquid is able to join the relevant trough. Advantageously, this groove mainly extends in a direction parallel to the vertical axis.

According to one feature of the present invention, the means for plugging the stacks form gutters having a suitable profile for the flow of the collected liquid. For example, these gutters can have a V, U or W profile, with it being understood that any other shape that allows the first portion of the liquid to be collected can be contemplated without departing from the context of the invention.

According to certain embodiments of the invention, at least one mixing component can be arranged in each trough. For example, this at least one mixing component can assume the form of a ramp that the liquid, or at least the second portion of this liquid, has to follow to join the lower plate and therefore to leave the dispensing device according to the invention. Advantageously, each trough comprises two ramps respectively extending from one of the longitudinal ends of the relevant trough. These ramps then operate as small collection components, which advantageously allow the liquid to be mixed in the longitudinal direction. In other words, opening one-in-two longitudinal ends of the means for plugging the stacks allows transverse mixing of the liquid, whilst these mixing components arranged in the troughs allow longitudinal mixing of this liquid. Thus, the present invention allows two-way, sufficient and homogeneous mixing of the liquid, which fully promotes the future exchanges to be made between this liquid and the gas circulating in the column, in which the dispensing device is intended to be integrated.

The present invention can also relate to a gas/liquid separation column that comprises at least one dispensing device according to the invention, said at least one dispensing device being arranged upstream of a contact component between the liquid and the gas in a first circulation direction of the liquid through the column.

According to certain embodiments of the present invention, the column can comprise a first contact component arranged upstream of the dispensing device according to the invention, the contact component arranged downstream of this dispensing device in the first circulation direction of the liquid through the column then being a second contact component.

According to one feature of the invention, at least one support beam can be positioned on at least two means for plugging the stacks of the dispensing device, said at least one support beam being configured to support the first contact component arranged upstream of the dispensing device in the first circulation direction of the liquid through the column. "Positioned on at least two means for plugging the stacks" is understood to mean the fact that this at least one support beam mainly extends along the transverse axis.

In other words, the column comprises, in this order, in a circulation direction of the liquid through the column, the first contact component between the liquid and the gas, the at least one support beam, on which this first contact component is arranged, the dispensing device according to the invention, on which the at least one support beam and the second contact component are arranged. Furthermore, this at least one support beam is configured so that, once in position between the contact component and the dispensing device, it promotes the circulation of the gas and consequently improves the distribution of the gas over the contact component. Optionally, the first contact component can be supported by a plurality of support beams.

BRIEF DESCRIPTION OF THE DRAWINGS

Further details, features and advantages will become more clearly apparent upon reading the detailed description, which is provided hereafter by way of an illustration, with respect to the various embodiments illustrated in the following figures.

DETAILED DESCRIPTION OF THE INVENTION

Figure 1:
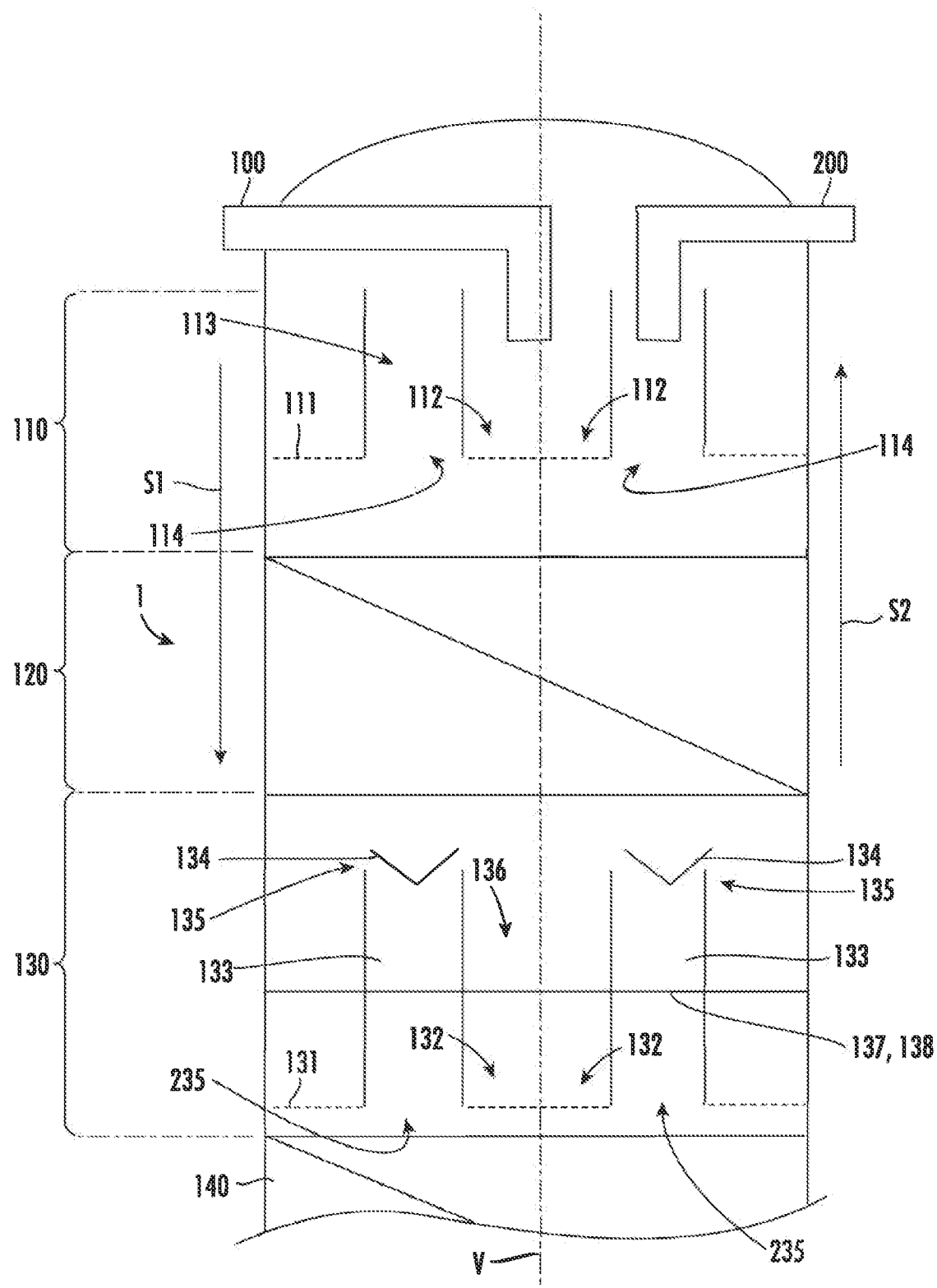
FIG. 1 schematically illustrates an upper part of a gas/liquid separation column according to the present invention.

FIG. 1 schematically shows an upper part of a column 1 for bringing a gas and a liquid into contact according to the present invention. This column 1 mainly extends along a vertical axis V and can, for example, have a circular cross-section. Such a column 1 comprises at least one liquid inlet 100 and one gas inlet, not illustrated herein, and also one liquid outlet, not illustrated herein, and one gas outlet 200. According to one example illustrated herein, the liquid inlet 100 and the gas outlet 200 assume the form of pipes.

The liquid circulates through the column 1 in a downward first flow direction 51 and for its part the gas circulates through the column 1 in an upward second flow direction S2, opposite the first direction 51. It is therefore understood that a liquid outlet and a gas inlet are arranged in a lower portion of the column 1, not illustrated herein. In the remainder of the description the terms "upstream", "downstream", "above", "below", "inlet" and "outlet" refer to the downward first flow direction 51 of the liquid through the column 1.

Thus, in the first flow direction 51 of the liquid through the column 1, said column comprises a first dispensing device 110 configured to collect the liquid that enters the column 1 via the liquid inlet 100 and to distribute it over an entire surface, in this case an upper surface, of a first contact component 120. The liquid that emerges from this first contact component 120 is then collected by a second dispensing device 130 according to the present invention. More specifically, and as will be described in further detail hereafter, this second dispensing device 130 differs from the first dispensing device 110 in that it allows the collected liquid to be mixed before it is distributed over the entire surface of a second contact component 140, with this second contact component 140 being only partially shown in FIG. 1.

Each of the dispensing devices 110, 130 comprises at least one plate 111, 131, in which orifices 112, 132 are provided, through which orifices the liquid is able to leave the relevant dispensing device 110, 130. As illustrated, stacks 113, 133 emerge from this plate 111, 131 and extend parallel to the vertical axis V when the dispensing device is disposed in the separation column. According to the invention, these stacks 113, 133 are configured to be followed by the gas in the second circulation direction S2. To this end, the plates 111, 131 of these dispensing devices 110, 130 each comprise a plurality of cutouts 114, 235, arranged facing each of these stacks 133. In other words, each plate 111, 131 comprises as many cutouts 114, 235 as the relevant dispensing device 110, 130 comprises stacks 113, 133.

The second dispensing device 130 differs from the first dispensing device 110, particularly due to the presence of plugging means 134 arranged on each stack 133, at one end thereof. These plugging means 134 are, among other things, configured to prevent the liquid that leaves the first contact component 120 from being introduced into the stacks 133 of the second dispensing device 130 and from disrupting the gas from rising via these stacks 133.

Openings 135 are provided between each plugging means 134 and the stack 133 on which it is arranged so as to allow the gas circulating in these stacks 133 to leave this second dispensing device 130, in order to join the first contact component 120. For example, these openings 135 can be made by holes perforated in an upper region of each stack 133, under the corresponding plugging means 134.

As will be described in further detail hereafter, these plugging means 134 are in the shape of a gutter configured to collect a first portion of the liquid originating from the first contact component 120. It is also to be noted that two successive stacks 133 together demarcate a trough 136 configured to directly collect a second portion of the liquid originating from the first contact component 120. It must be understood that FIG. 1 is schematic and that the second dispensing device 130 can comprise, depending on its size and, for example, its diameter, a plurality of stacks 133 and also a plurality of troughs 134.

The dispensing device according to the invention comprises means for communicating between the plugging means provided on the stacks and the troughs so that, as will be described hereafter, the first portion of the liquid collected by the plugging means 134 is routed towards one of the troughs 136 of the second dispensing device 130 in order to be able to leave said device.

Thus, once the liquid has entered the column 1 through the inlet 100, the liquid is distributed, particularly by virtue of the first dispensing device 110 over the entire surface of the first contact component 120, where it is then in contact with the gas present in the column 1. An exchange of heat and/or of material has then occurred between this gas and this liquid in this first contact component 120. The gas rises in the separation column and then leaves the first contact component 120 in order to join the gas outlet 200, by passing through the stacks 113 of the first dispensing device 110. Upon exiting the column 1, this gas is pure and it then can be condensed, then conditioned for future use. At the same time, the liquid flows by descending along the length of the separation column and leaves the first contact component 120 in order to be directed towards the second dispensing device 130. As previously stated, a first portion of this liquid is then collected by the plugging means 134 arranged at the apex of the stacks 133 of this second dispensing device 130, and a second portion of this liquid for its part is directly collected by the troughs 136 provided between these stacks 133. As will be described in further detail hereafter with reference to FIG. 2, the second dispensing device 130 further comprises at least one upper peripheral channel 537, 538 configured to directly collect a third portion of the liquid conveyed through the dispensing device, as well as to allow the first portion of liquid directly collected by the plugging means 134 to flow from an open longitudinal end of these plugging means towards the troughs 136.

Advantageously, the second dispensing device 130 is in the shape of a disc demarcated by a peripheral edge 230 and dimensioned to perfectly adapt to the circular section of the column 1. The troughs 136 and the stacks 133 are arranged in series, parallel to each other and alternately, so as to extend over the entire surface of the disc. In this way, all the liquid passing through the second dispensing device 130, between the first contact component 120 and the second contact component 140, enters this second dispensing device either via the troughs or via the stacks or via the at least one peripheral channel 537, 538.

With reference to FIGS. 2 to 5, the arrangement and the operation of the second dispensing device 130 produced according to the present invention will now be described in further detail.

Figure 2:
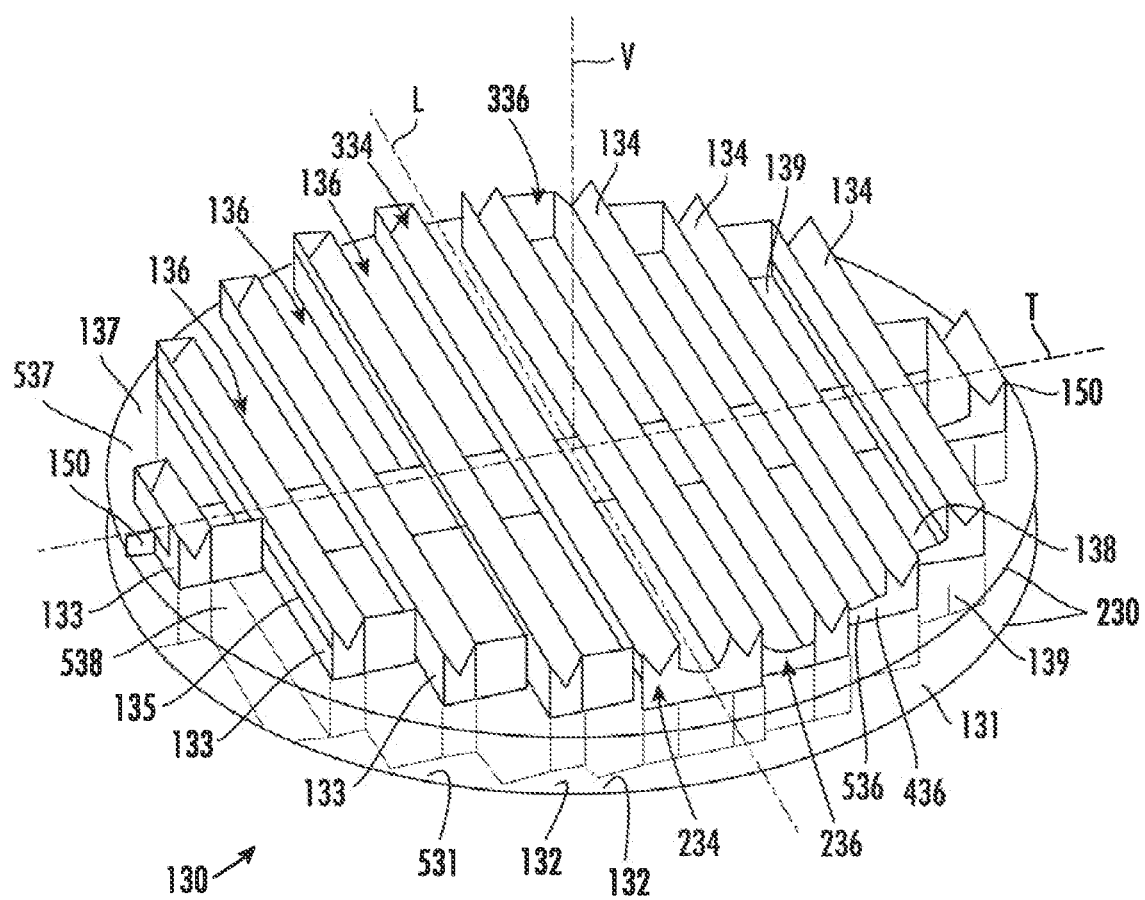
FIG. 2 is a perspective view of a dispensing device according to a first embodiment of the present invention, said dispensing device being intended to be integrated within the gas/liquid separation column shown in FIG. 1.
Figure 3:
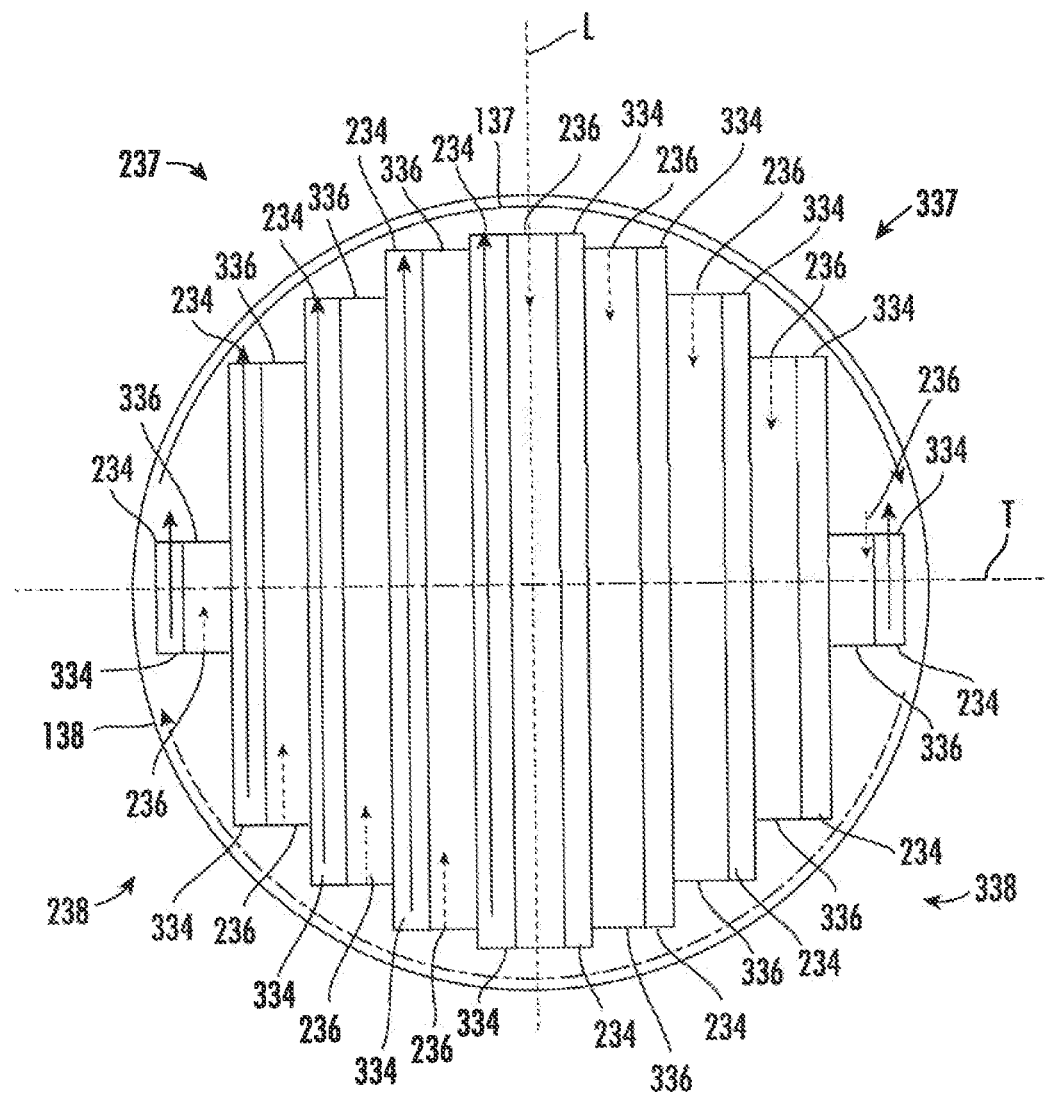
FIG. 3 schematically illustrates, as a top view, the dispensing device, respectively according to the first embodiment illustrated in FIG. 2 and a second embodiment of the present invention.

FIGS. 2 and 3 illustrate the dispensing device 130 according to a first embodiment of the present invention.

FIG. 2 is a perspective view of the dispensing device 130 according to the invention. As stated above, the dispensing device 130 according to the invention comprises two stages of plates axially superposed along the vertical axis V, with a plate 131, herein called lower plate, in which several orifices 132 are provided, through which orifices the liquid is able to leave the dispensing device 130, and an upper plate 137, 138, shown as dashed lines on the section view of FIG. 1. The dispensing device 130 further comprises the stacks 133, which emerge from the lower plate 131 and extend parallel to the vertical axis V beyond the upper plate 137, 138. It is understood that the designation of lower and upper plates is in accordance with their arrangement according to the orientation of the dispensing device 130 when it is integrated in a column, as illustrated in FIG. 1.

The lower plate 131 mainly falls within a first plane and the upper plate 137, 138 for its part falls within a second plane parallel to the first plane and separate therefrom. The upper plate comprises two symmetrical portions 137, 138 arranged on either side of a transverse axis of symmetry T. In the illustrated example, once the dispensing device 130 is in position in the column, these lower 131 and upper 137, 138 plates extend in contact with the wall of this column, so as to form sealed receptacles on the periphery of the device and in which the liquid is able to circulate. More specifically, it is the peripheral edge 230 of these plates 131, 137, 138 that is arranged in contact with the wall of the column. This arrangement has the advantage of dispensing with an additional peripheral plate for closing the receptacles. It will be understood that, without departing from the context of the invention, the peripheral edge 230 of the plates can be extended by a raised edge, that would come into abutment against the wall of the column allowing this seal to be provided.

The lower plate 131 has a circular shape and the upper plate 137, 138 has a substantially annular shape.

The stacks 133 extend vertically from the lower plate 131 and beyond each of the upper plates 137, 138 and longitudinally, i.e. along a longitudinal axis L perpendicular to the vertical axis V, on the two symmetrical portions of the upper plate 137, 138. In other words, each stack 133 continuously extends both over a first portion of the upper plate 137 and over a second portion of the upper plate 138. As stated above, the dispensing device 130 according to the invention also comprises a plurality of troughs 136, with each trough 136 being transversely demarcated, i.e. along the transverse axis T perpendicular to the vertical axis V and to the longitudinal axis L, by two stacks 133. As shown, a first upper peripheral channel 537 and a second upper peripheral channel 538 are respectively provided on the first portion of the upper plate 137 and on the second portion of this upper plate 138 between the longitudinal ends of the stacks 133 and the peripheral edge 230 of the dispensing device 130. The dispensing device 130 according to the invention further comprises a lower peripheral channel 531 provided on the lower plate 131, between the longitudinal ends of the stacks 133 and the peripheral edge 230 of the dispensing device 130. In other words, when the dispensing device 130 is positioned in a column, these upper 537, 538 and lower 531 peripheral channels are provided between the longitudinal ends of the stacks 133 and the wall of the column.

On the lower plate 131, the orifices 132 through which the liquid is able to leave the dispensing device 130 are provided, on the one hand, between the stacks 133 that emerge from the lower plate 131, i.e. in the base of the troughs 136, and, on the other hand, in the lower peripheral channel 531. In other words, in order to be able to leave the dispensing device 130, the liquid must pass through at least one of these troughs 136 or through the lower peripheral channel 531.

The plugging means 134 as previously described are respectively disposed on each of the stacks 133, with each plugging means 134 being arranged at an upper vertical end of the relevant stack 133. Each plugging means 134 is configured to, on the one hand, prevent the liquid from entering these stacks 133 and, on the other hand, to collect this liquid, and more specifically the first portion of this liquid as previously described. To this end, these plugging means 134 each have a gutter shape. According to the example illustrated herein, these gutters more specifically have a V profile. It is understood that these gutters also could have a U profile or a profile in any other shape without departing from the context of the present invention, provided that this other shape allows the first portion of the liquid to be collected and guided towards at least one of the gutters. Advantageously, openings 135 are provided between each plugging means 134 and the stack 133 on which it is arranged, so as to allow the gas circulating in these stacks 133 to leave this dispensing device 130 and to continue to rise along the gas/liquid separation column. According to the example illustrated in FIG. 2, these openings 135 assume the shape of slots, with each of these slots extending over the entire longitudinal dimension of the stack 133 in which it is provided.

A wall 150 is advantageously disposed at each transverse end of the upper plate, i.e. at the junction of the first and second portions of the upper plate 137, 138, between the peripheral edge 230 of the dispensing device 130 and the stack 133 closest to this transverse end. In this way, the first upper plate portion 137 and the second upper plate portion 138 are mutually sealed. More specifically, this wall 150 is positioned at the junction of the first upper peripheral channel 537 and of the second upper peripheral channel 538: the liquid falling onto the dispensing device, directly onto either one of these upper peripheral channels 537, 538, thus can run along the first portion, respectively the second portion, of the upper plate, without passing into the second portion, respectively the first portion.

It is also to be noted in this FIG. 2 that two ramps 139 are arranged in each trough 136. According to an alternative embodiment that is not illustrated herein, a different number of ramps and, for example, only one ramp, can be arranged in each trough 136, without departing from the context of the invention, once a space is provided between the ramps or at the longitudinal end of one of the ramps in order to allow through the liquid flowing along these ramps towards the lower plate 131. As illustrated, these ramps 139 respectively extend from either one of the longitudinal ends of the relevant trough 136.

These ramps 139 are mixing components that allow mixing of the second portion of liquid directly collected by the troughs 136 in a longitudinal direction, by directing this second portion of liquid towards the one or more passage(s) provided between the ramps. Part of this second portion of the liquid falls onto these ramps 139, which thus change the trajectory followed by this part of the second portion of the liquid and then allow mixing of this second portion of the liquid in the longitudinal direction.

Each plugging means 134 has a first open longitudinal end 234 and a second closed longitudinal end 334, with these two longitudinal ends 234, 334 being opposite each other along the longitudinal axis L. In other words, the liquid collected by one of these plugging means 134 can only leave said plugging means 134 through one of the longitudinal ends of said plugging means 134, namely the first open longitudinal end 234. Depending on the orientation of the plugging means, i.e. depending on whether the open longitudinal end emerges on the first upper peripheral channel 537 or on the second upper peripheral channel 538, the liquid collected in this plugging means only joins the first upper plate portion 137 or the second upper plate portion 138.

Furthermore, each trough 136 has, at the upper plate 137, 138, an open longitudinal end 236 and a closed longitudinal end 336. However, the longitudinal ends of the troughs are both open between the upper plate 137, 138 and the lower plate 131. In other words, each trough comprises two open lower longitudinal ends, with these lower longitudinal ends emerging between the upper plate 137, 138 and the lower plate 131, an open upper longitudinal end 236 and a closed upper longitudinal end 336, with said upper longitudinal ends 236, 336 extending into either one of the upper peripheral channels 537, 538. In order to better understand the following description, the open 236 or closed 336 upper longitudinal ends are simply called "open longitudinal ends 236" or "closed longitudinal ends 336".

Thus, each trough 136 is closed at each of these longitudinal ends 236, 336 by a wall 436, and the longitudinal ends are said to be open when a groove 536 is provided in this wall and are said to be closed when the walls are solid, without grooves.

The grooves 536 in this way are configured to be followed by the liquid circulating along the upper plate, so that this liquid can join the relevant trough 136. According to the example illustrated herein, the grooves 536 extend along the vertical axis.

The walls 436 of the troughs 136 in which the grooves 536 are formed can have different heights, which are adjustable as a function of the flow of the liquid that circulates in the separation column, so that each trough 136 receives the same amount of liquid as the other troughs. These heights are measured parallel to the vertical axis V.

Depending on the orientation of the trough, i.e. depending on whether the open longitudinal end emerges on the first portion of the upper plate or on the second portion of the upper plate, the liquid entering this trough can only originate from the first upper plate portion 137 or from the second upper plate portion 138. In other words, with the open longitudinal ends 236 of the troughs 136 only emerging in either one of the upper plate portions 137, 138, it is understood that the liquid circulating over this upper plate 137, 138 cannot join the lower plate 131 and therefore the orifices 132, allowing it to leave the dispensing device 130 only through certain troughs 136.

The result of the above is that, by modulating the opening and closing of the longitudinal ends of the plugging means 134 and of the troughs 136, the liquid passing through the dispensing device can be directed from the upper plate towards the lower plate 131, by redistributing it from one side of the device, relative to the transverse axis T, to the other side during this journey. This redistribution particularly occurs via the guidance of the plugging means 134 and the openings provided in the troughs. The first portion of the liquid is thus mixed with the second portion of this liquid so that the liquid that leaves the dispensing device 130 to join the second contact component is homogeneous, i.e. the proportions of the elements present in this liquid are identical, or substantially identical, at any point of the second contact component.

The cumulation of the first portion of the liquid directly collected by the plugging means 134 and of the third portion of the liquid directly collected by the upper peripheral channels 537, 538 is greater than the second portion of this liquid directly collected by the troughs 136. For example, the second portion represents 40% of all the liquid that passes through the second dispensing device 130.

According to one embodiment, not illustrated herein, all the longitudinal ends of the troughs can be open. The distribution of the liquid along the transverse axis is then randomized, but the longitudinal distribution, between the first and the second upper plate portion, remains effective.

Figure 4:
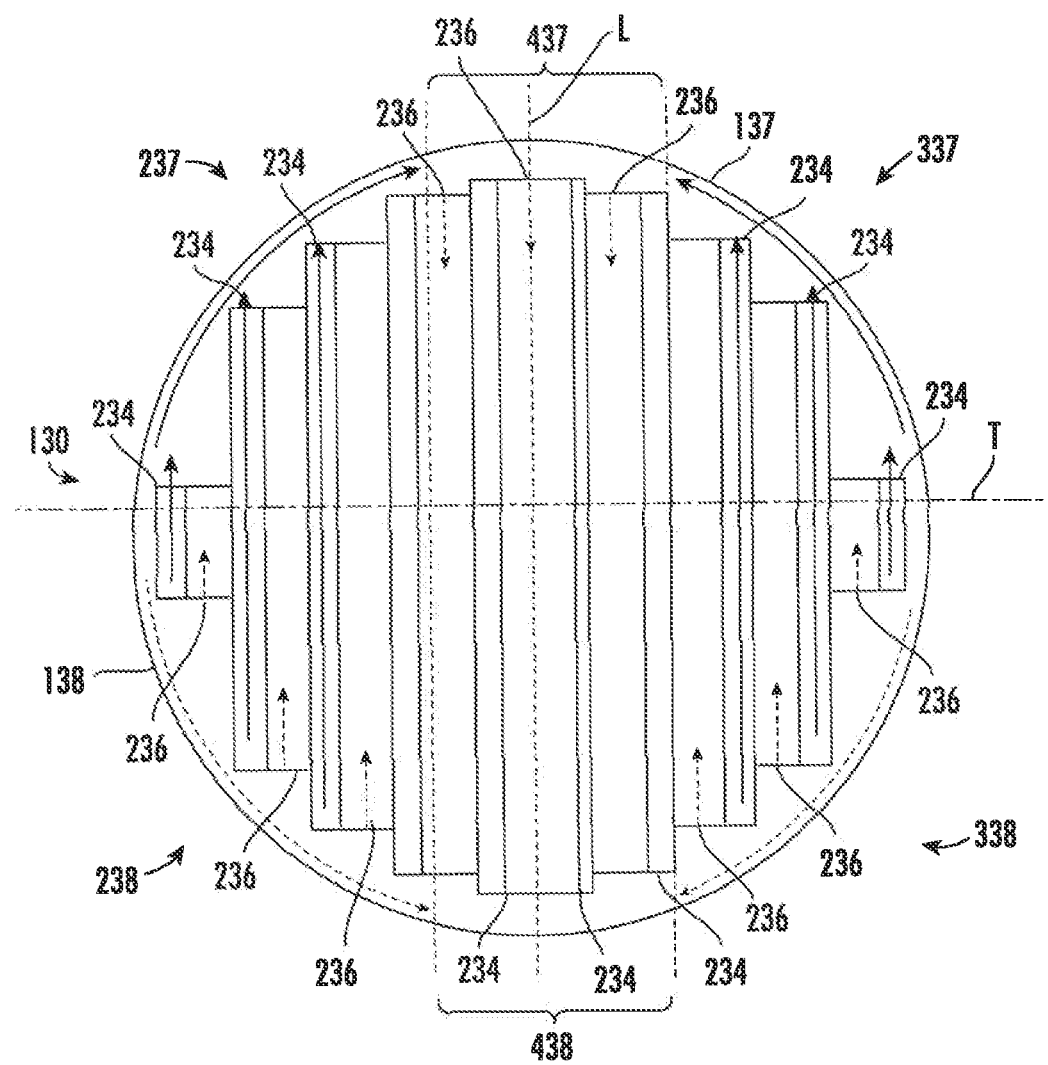
FIG. 4 schematically illustrates, as a top view, the dispensing device, respectively according to the first embodiment illustrated in FIG. 2 and a second embodiment of the present invention.

FIGS. 3 and 4 are top views of the dispensing device 130 according to the present invention, respectively according to a first embodiment and to a second embodiment. These embodiments differ with respect to the positioning of the open 234, 236 and closed 334, 336 longitudinal ends of the plugging means 134 and of the troughs 136, and in this way involve different circulations of the liquid through the plugging device, which will be described in greater detail hereafter.

In order to more clearly describe the redistribution of the liquid, a functional distribution of the upper plate is defined, on the one hand, by cutting the upper plate into two symmetrical portions on either side of the transverse axis as previously described, and, on the other hand, by cutting each symmetrical portion into two parts on either side of the longitudinal axis.

According to the first embodiment illustrated in FIG. 3, each upper plate portion 137, 138 is divided into a first transverse part 237, 238 and a second transverse part 337, 338 arranged on either side of the longitudinal axis L. The first transverse part 237 of the first upper plate portion 137 is arranged in the longitudinal extension of the first transverse part 238 of the second upper plate portion 138. As shown, a first set of open longitudinal ends 234 of the plugging means 134 is arranged in the first transverse part 237 of the first upper plate portion 137 and a second set of these open longitudinal ends 234 is arranged in the second transverse part 338 of the second upper plate portion 138. At the same time, the open longitudinal ends 236 of the troughs 136 are disposed on the second transverse part 337 of the first upper plate portion 137 and on the first transverse part 238 of the second upper plate portion 138.

As shown by the arrows, the liquid that leaves the plugging means 134 at one of the transverse parts of one of the upper plate portions (solid line arrow) can only join the lower plate 131, and therefore the orifices 132 that allow it to leave the dispensing device 130, through the troughs 136, the open longitudinal end 236 of which is arranged in the other transverse part of this same upper plate portion (dashed line arrow). Thus, the liquid is horizontally mixed along the transverse axis T.

According to the second embodiment illustrated in FIG. 4, each upper plate portion 137, 138 is divided into a first transverse end part 237, 238, a central part 437, 438 and a second transverse end part 337, 338, with each part of the first upper plate portion 137 being arranged in the longitudinal extension of the corresponding part of the other upper plate portion 138.

According to this second embodiment, the open longitudinal ends 234 of the plugging means 134 that emerge in the first upper plate portion 137 more specifically emerge in the transverse end parts 237, 337 of this first upper plate portion 137 and the open longitudinal ends 236 of the troughs 136 that emerge in this first upper plate portion 137 emerge in the central part 437 of this first upper plate portion 137. Conversely, with respect to the second upper plate portion 138, the open longitudinal ends 234 of the plugging means 134 that emerge on this second upper plate portion 138 more specifically emerge in the central part 438 of this second upper plate portion 138 and the open longitudinal ends 236 of the troughs 136 that emerge in this second upper plate portion 138 emerge in the transverse end parts 238, 338 of this second upper plate 138.

As illustrated by the arrows in FIG. 4, the liquid that leaves the plugging means 134 in a transverse end part 237, 238, 337, 338 of one of the upper plate portions 137, 138 (solid line arrows) joins the lower plate 131, and therefore the orifices 132 that are arranged therein, through a trough 136 arranged in the central part 437, 438 of the relevant upper plate 137, 138 (dashed line arrows). By contrast, the liquid that leaves the plugging means 134 in the central part 437, 438 of one of the upper plate portions 137, 138 (solid line arrows) joins the lower plate 131 through a trough 136 arranged in one of the transverse end parts 237, 238, 337, 338 of this upper plate portion 137, 138 (dashed line arrows).

Figure 5:
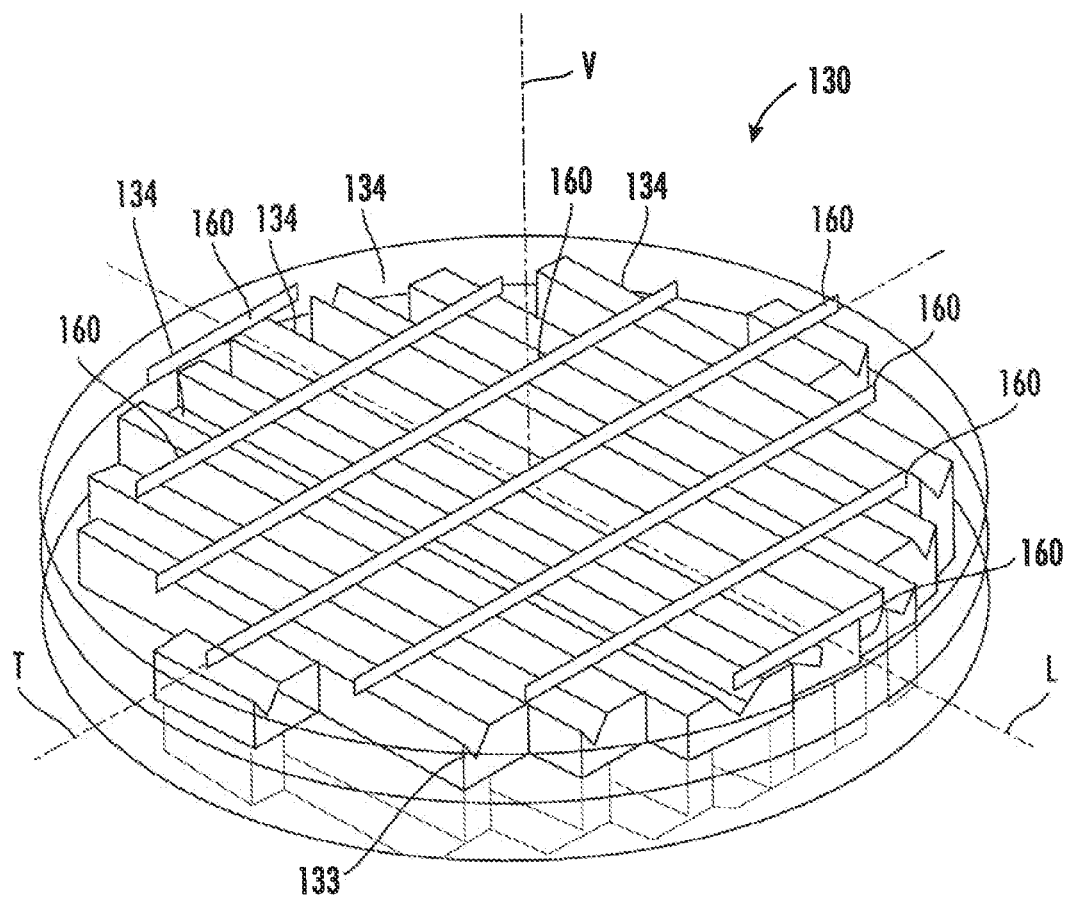
FIG. 5 illustrates, as a perspective view, an alternative embodiment of the dispensing device according to the present invention.

According to any one of these embodiments, the dispensing device 130 can also comprise at least one support beam 160, and advantageously a plurality of support beams 160. These support beams 160 are shown in FIG. 5, for example. As illustrated, these support beams 160 are disposed on the means 134 for plugging the stacks 133, perpendicular to these stacks.

The support beams 160 thus mainly extend along the transverse axis T and are stacked one after the other along the longitudinal axis L. Advantageously, these support beams 160 are configured, on the one hand, to support the first contact component arranged upstream of the dispensing device 130 when it is integrated in the previously described column, and, on the other and, to sufficiently separate this first contact component from the dispensing device 130, so as to ensure that there is a fluid and homogeneous circulation of the gas that leaves the dispensing device 130 through the stacks 133. Indeed, it is understood that by positioning this first contact component directly in contact with the plugging means 134, this circulation of the gas would risk being obstructive, then reducing the performance of the first contact component and therefore of the entire column.

The dispensing device according to the present invention proposes a simple and inexpensive means, which allows a liquid to be collected, mixed in at least two directions, so as to make it completely homogeneous in terms of proportions of its constituent elements, and allows it to be evenly redistributed, for example, towards a contact component of a gas/liquid separation column. As previously described with reference to a plurality of embodiments, the two-way mixing is implemented by the configuration of the openings at either one of the longitudinal ends of the means for plugging the stacks, as well as, where appropriate, by the configuration of the openings of the upper parts of the troughs extending beyond the upper plate, as well as, where appropriate, by the presence of the ramps in the troughs.

However, the present invention is not limited to the means and configurations described and illustrated herein, and it also extends to any equivalent means and configuration, as well as to any technically operative combination of such means. In particular, the shape and the disposition of the open longitudinal ends of the plugging means and of the troughs can be modified without being detrimental to the invention, as long as they meet the functionalities described and illustrated in the present document.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed.

Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited

The invention claimed is:

1. Gas/liquid separation column, comprising a dispensing device and a gas/liquid contact component, adapted so that a fluid flows in a first liquid circulation direction through the dispensing device upstream of the gas/liquid contact component, the dispensing device comprising:

a plurality of stacks extending from a lower plate along a vertical axis perpendicular to a first plane, each stack being configured to be followed by a gas in a second circulation direction opposite the first direction, the stacks being disposed above cutouts in the lower plate, at least one opening being laterally provided in a wall demarcating each stack in a vicinity of a vertical end of each stack;

a plurality of gutters, respectively arranged at an upper vertical end of one of the stacks and over the entire longitudinal dimension of said stack, each gutter allowing direct collection of a first portion of a liquid that is conveyed through the dispensing device, the gutters each having a first open longitudinal end and a second closed longitudinal end, so as to force the liquid to exit the gutter via the first open longitudinal end;

the lower plate mainly falling within the first plane and in which a plurality of orifices are provided, through which the liquid is able to leave the dispensing device;

a plurality of troughs configured to directly collect a second portion of the liquid conveyed through the dispensing device, each trough mainly extending along a longitudinal axis and being transversely demarcated by at least one stack, at least one part of the plurality of orifices being distributed in a base of each trough, each trough having the lower plate for the base, each trough comprising a first open longitudinal end and a second closed longitudinal end, the first open longitudinal end of each trough comprising a wall, in which a groove is provided, through which the liquid is able to join each trough;

the dispensing device being configured so that the first portion of the liquid leaving the gutters pours into the troughs; and at least one upper peripheral channel provided between the longitudinal ends of each gutter and a peripheral edge of the dispensing device, said at least one upper peripheral channel forming an upper plate of substantially annular shape and being configured in order to, on the one hand, directly collect a third portion of the liquid conveyed through the dispensing device and, on the other hand, allow the circulation of the first portion of the liquid exiting the gutters towards the troughs, the upper peripheral channel being located above the lower plate at an intermediate level of the height of the stacks.

2. The column according to claim 1, wherein the dispensing device is configured so that all the liquid passes through the troughs in order to join the lower plate, but only one portion of said liquid is directly collected by these troughs, without passing through the gutters arranged on the stacks.

3. The column according to claim 1, wherein the gutters and the at least one upper peripheral channel extend so that on an upper plate, an overall extension surface of the gutters cumulated with an overall extension surface of the at least one upper peripheral channel is greater than an overall extension surface of the troughs.

4. The column according to claim 1, wherein the gutters and the at least one upper peripheral channel extend so that an overall extension surface of the gutters cumulated on an overall extension surface of the at least one upper peripheral channel corresponds to at least 40% of an overall surface of the lower plate.

5. The column according to claim 1, wherein an upper plate comprises two upper plate portions arranged on either side of a transverse axis in the first plane, each upper plate portion comprises a first transverse part and a second transverse part, the first transverse part of the first upper plate portion being arranged in an extension of the first transverse part of the second upper plate portion, and wherein a first set of open longitudinal ends of the gutters is arranged in the first transverse part of one of the upper plate portions and a second set of these open longitudinal ends of the gutters is arranged in the second transverse part of the other upper plate portion.

6. The column according to claim 1, wherein an upper plate comprises two upper plate portions arranged on either side of a transverse axis in the first plane, each upper plate portion comprises a first transverse end part, a central part and a second transverse end part, the central part of said upper plate portion being arranged between the two transverse end parts of the upper plate portion, the first transverse end part, the central part and the second transverse end part of the first upper plate portion being arranged in an extension, respectively, of the first transverse end part, of the central part and of the second transverse end part of the second upper plate portion, and wherein a first set of open longitudinal ends of the gutters emerging in the same upper plate portion is distributed in either one of the transverse end parts of said upper plate portion and a second set of open longitudinal ends of the gutters emerging in the other upper plate portion is arranged in the central part of this other upper plate portion.

7. The column according to claim 1, wherein at least one mixing component is arranged in each trough.

8. The column according to claim 1, further comprising a first contact component arranged upstream of the dispensing device, the first contact component arranged downstream of the dispensing device in a first circulation direction of the liquid through the column then being a second contact component.

9. The column according to claim 1, wherein at least one support beam is positioned on at least two means of plugging the stacks of the dispensing device, said at least one support beam being configured to support a first contact component arranged upstream of the dispensing device in a first circulation direction of the liquid through the column.

* * * * *